US009173044B2

(12) United States Patent
Coto-Lopez

(10) Patent No.: US 9,173,044 B2
(45) Date of Patent: Oct. 27, 2015

(54) METHOD AND SYSTEM FOR DELIVERING ANNOUNCEMENTS IN A CABIN

(75) Inventor: Gerald Coto-Lopez, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1361 days.

(21) Appl. No.: 12/713,550

(22) Filed: Feb. 26, 2010

(65) Prior Publication Data

US 2010/0221992 A1 Sep. 2, 2010

Related U.S. Application Data

(60) Provisional application No. 61/155,981, filed on Feb. 27, 2009.

(30) Foreign Application Priority Data

Feb. 27, 2009 (DE) ......................... 10 2009 010 872

(51) Int. Cl.
*B60H 1/00* (2006.01)
*B64D 13/04* (2006.01)
*H04R 27/00* (2006.01)
*H04R 5/033* (2006.01)

(52) U.S. Cl.
CPC ................ *H04R 27/00* (2013.01); *H04R 5/033* (2013.01)

(58) Field of Classification Search
USPC .................................................. 381/82, 71.4
See application file for complete search history.

(56) References Cited

U.S. PATENT DOCUMENTS

| | | | | |
|---|---|---|---|---|
| 5,668,884 | A * | 9/1997 | Clair et al. | 381/82 |
| 6,678,464 | B1 * | 1/2004 | Kawai et al. | 386/252 |
| 2003/0093798 | A1 * | 5/2003 | Rogerson | 725/75 |
| 2006/0287745 | A1 * | 12/2006 | Richenstein et al. | 700/94 |
| 2007/0189549 | A1 | 8/2007 | Scheel et al. | |
| 2009/0298420 | A1 * | 12/2009 | Haartsen et al. | 455/3.06 |

FOREIGN PATENT DOCUMENTS

DE 102006005584 A1 8/2007

* cited by examiner

*Primary Examiner* — Duc Nguyen
*Assistant Examiner* — Phan Le
(74) *Attorney, Agent, or Firm* — The Webb Law Firm

(57) ABSTRACT

A method for delivering announcements via a cabin communication facility comprising at least one cabin loudspeaker and via an on-board entertainment system comprising at least one headset output comprises the steps of delivering an announcement via the at least one cabin loudspeaker, beginning at a first instant, and delivering the announcement via the at least one headset output, beginning at a second instant, which differs from the first instant, the delivering of the announcement via the at least one cabin loudspeaker and the delivering of the announcement via the at least one headset output being initiated at differing instants.

10 Claims, 2 Drawing Sheets

METHOD AND SYSTEM FOR DELIVERING ANNOUNCEMENTS IN A CABIN

CROSS-REFERENCE TO RELATED APPLICATIONS

This application claims priority to German Application No. 10 2009 010 872.6, filed Feb. 27, 2009 and to U.S. Provisional Application No. 61/155,981, filed Feb. 27, 2009.

BACKGROUND OF THE INVENTION

1) Field of the Invention

The invention relates to a method for delivering announcements via a cabin communication facility comprising at least one cabin loudspeaker and via an on-board entertainment system comprising at least one headset output, and to a system for delivering announcements in a cabin, in particular an aircraft cabin. Usually, each headset output has the form of a headset connection socket.

2) Discussion of the Prior Art

Modern passenger aircraft are equipped with a cabin communication facility and an on-board entertainment system. The cabin communication facility is a so-termed “cabin intercommunication data system (CIDS)”, by means of which the pilot of the aircraft and the cabin crew can make announcements, addressed to the passengers, via cabin loudspeakers installed in the cabin. The on-board entertainment system is a so-termed “in-flight entertainment system (IFE)”, by means of which passengers are provided with entertainment offers. For example, the passengers can listen to music, watch films or play games. A headset output, to which a headset can be connected, is provided at each passenger seat. The passengers can use the headsets to listen to audio recordings of the on-board entertainment system.

When an announcement is made via the cabin loudspeakers, the delivery of audio recordings of the onboard entertainment system via the headsets is interrupted. During the delivery of the announcement via the cabin loudspeakers, either no audio signals at all are delivered via the headset, or the announcement is delivered additionally via the headsets.

If a passenger continues to wear his/her headset during the delivery of the announcement via the cabin loudspeakers while, at the same time, the delivery nouncement via the headset, the loudspeakers of the headset, particularly its foam covers, cover the ears, or auditory passages, of the passenger, with the result that the announcement delivered via the cabin loudspeakers can be heard, or comprehended, only to a limited extent by the passenger. This is problematic, since it must be ensured that announcements can be heard clearly and comprehensively by all passengers at all times, such that, for example in emergency situations, information can be provided directly to all passengers.

If, on the other hand, the announcement is also delivered via the headset during the delivery of the announcement via the cabin loudspeakers, the passenger hears the announcement twice, owing to a short time delay between the delivery of the announcement via the cabin loudspeakers and the delivery of the announcement via the headset. This time delay results from design, since the cabin communication facility and the on-board entertainment system are separate systems having differing delay times and processing speeds. If, for example, an announcement is spoken into a microphone of the cabin communication facility, this announcement is delivered directly via the cabin loudspeakers. By contrast, an announcement to be delivered via a headset must first be passed from the cabin communication facility to the on-board entertainment system and then to the headset inserted in a headset output at the passenger seat. In the case of a passenger using a headset, the thus time-delayed delivery of the announcement via the headset output results in an echo effect that renders comprehension of the announcement difficult or even impossible.

SUMMARY OF THE INVENTION

The invention is directed towards the prevention of an echo effect in the case of a delivery of announcements via cabin loudspeakers of a cabin communication facility and a headset connected to an on-board entertainment system.

Provided for the purpose of achieving this object is a method for delivering announcements via a cabin communication facility comprising at least one cabin loudspeaker and via an on-board entertainment system comprising at least one headset output, the method comprising the steps of delivering an announcement via the at least one cabin loudspeaker, beginning at a first instant, and delivering the announcement via the at least one headset output, beginning at a second instant, which differs from the first instant, the delivering of the announcement via the at least one cabin loudspeaker and the delivering of the announcement via the at least one headset output being initiated at differing instants. Here, the delivering of an announcement means the actual delivery of this announcement by the cabin loudspeaker or loudspeakers and the actual provision of the output signal at the headset output.

The announcements may be any type of audio signal, for example spoken announcements, sounds or pieces of music. The initiation of the delivery of the announcement via the at least one cabin loudspeaker can be effected, for example, via a microphone connected to the cabin communication facility, the initiation being activated through actuation of a speech pushbutton on the microphone. Correspondingly, the initiation of the delivery of the announcement via the at least one headset output can be activated by a control pulse of a control unit in dependence on the instant of actuation of the speech pushbutton. It is also conceivable for the announcement to be a stored announcement, such that the initiation of the delivery of the announcement via the at least one cabin loudspeaker is activated by a control pulse in the cabin communication facility, and the initiation of the delivery of the announcement via the at least one headset output is activated by a control pulse in the on-board entertainment system.

As a result of the deliberate time interval between the initiation of the delivery of the announcement via the at least one cabin loudspeaker and the initiation of the delivery of the announcement via the at least one headset output, the announcement is delivered via the at least one cabin loudspeaker and the at least one headset output in such a way that the passenger does not experience any echo effect. There are basically two possibilities for achieving this. The first possibility consists in the delivery of the announcement via the at least one headset output being initiated earlier than the delivery of the announcement via the at least one cabin loudspeaker. Preferably, the delivery of the announcement via the at least one headset output is initiated precisely so much earlier that there is simultaneous delivery of the announcement via the headset output and via the cabin loudspeaker. The other possibility consists in the initiation of the delivery of the announcement via the headset output being performed so much later than the initiation of the delivery of the announcement via the cabin loudspeaker that the human ear no longer perceives any echo effect.

In order that the passenger, when wearing a headset, can first hear the announcement via the at least one cabin loudspeaker, even if to a limited extent, and can then hear the announcement via the headset with a time delay that is not subject to an echo effect, the announcement via the at least one headset output is initiated chronologically after (in particular, chronologically after by a predefined time interval) the delivering of the announcement via the at least one cabin loudspeaker.

To enable the passenger to hear the announcement via his/her headset without crossover with the announcement delivered via the cabin loudspeaker, the second instant (at which the delivery of the announcement via the at least one headset output begins) can correspond with or chronologically succeed a third instant, at which the delivering of the announcement via the at least one cabin loudspeaker ends. The announcement can thus first be delivered in its entirety via the at least one cabin loudspeaker, and the delivery via the at least one headset output is effected only after the delivery of the announcement via the at least one cabin loudspeaker. In the case of this embodiment, therefore, it is not attempted, for the purpose of preventing an echo effect, to reduce the time delay between the delivery of the announcement via the at least one cabin loudspeaker and the delivery of the announcement via the at least one headset output, but, rather, the time delay is increased significantly. It is also conceivable in this case for a fixed value (for example, one second) to be predefined for the time interval between the initiations.

Preferably, the method comprises the further steps of acquiring the announcement via a microphone connected to the cabin communication facility, storing the picked-up announcement, directly delivering the acquired announcement via the at least one cabin loudspeaker, and delivering the stored announcement, with a time delay, via the at least one headset output. The storing of the acquired announcement (for example, in the cabin communication facility and/or on-board entertainment system) enables the delivery of the announcement via the at least one headset to be initiated at a desired instant. It is therefore possible to dispense with complex delay loops for the purpose of increasing the time interval between the delivery of the announcement via the at least one cabin loudspeaker and the delivery of the announcement via the at least one headset output.

In order to prevent the occurrence of further echo effects, or crossovers, of announcements in the case of the acquisition or delivery of a plurality of announcements (for example, an announcement by the aircraft captain and a directly succeeding announcement by a flight attendant), the method can comprise the following steps of picking up at least one further announcement via the microphone connected to the communication facility while or before the stored announcement is delivered via the at least one headset output, storing the at least one further announcement, and delivering the stored, at least one further announcement via the at least one headset output after the delivering of the first-stored announcement via the at least one headset output. Further acquired announcements can be stored according to the so-termed “first-in-first-out (FIFO)” and/or “first-in-last-out (FILO)” storage principles, and can be output via the at least one headset output. It is conceivable in this case that, for the initiation of the delivery of the stored announcements via the at least one headset output, there is a wait of a predefined time interval following the completion of the delivery of the announcement via the at least one headset output.

Preferably, the announcement undergoes analogue-to-digital and digital-to-analogue conversion before the delivery via the at least one headset output. The A/D conversion can be effected in the cabin communication facility or the on-board entertainment system. The A/D conversion enables the announcement to be stored digitally. The digitized announcement can be compressed before being stored, thereby reducing the storage space required. The reduction in storage requirement allows use of a smaller storage device, resulting in a weight reduction, which is advantageous, in particular, for aircraft. Further, the analogue-to-digital conversion enables the announcement to be transmitted as a so-termed “data stream”, based on a standardized network protocol, to the at least one headset output.

In order to dispense with further weight for cabling, particularly in an aircraft, the announcement can be transmitted wirelessly, between the A/D conversion and the D/A conversion, via an air interface in the cabin. Transmit/receive devices, which transmit the digitized announcements from a computer in the on-board entertainment system to headset outputs installed at the passenger seats, can then be provided in the on-board entertainment system. Preferably, a radio standard by which transmission is effected with least transmission powers is used for the wireless transmission.

To improve comprehension of the announcement via the headset, a noise suppression process can be applied to the announcement before the delivery via the at least one headset output. In aircraft cabins, in particular, there is a relatively high noise level, owing to turbine noise, with the result that announcements acquired by means of a microphone are overlaid with ambient noise. The noise suppression process enables the ambient noise to be selectively filtered out of the announcement, or suppressed. For example, a Fourier analysis, followed by selective filtering and back-transformation by means of Fourier synthesis, can be effected for the purpose of noise suppression. Preferably, the noise suppression process is applied to digitally stored announcements.

In order to prevent comprehension of the announcement from being impaired by entertainment audio recordings (for example, music or speech), delivery of entertainment audio recordings through the on-board entertainment system, via the at least one headset output, can be interrupted during the delivery of the announcement via the at least one cabin loudspeaker and during the delivery of the announcement via the at least one headset output.

Alternatively, it is possible for delivery of entertainment audio recordings through the on-board entertainment system to the at least one headset output not to be interrupted during the delivery of the announcement via the at least one cabin loudspeaker. According to this embodiment, the delivery of entertainment audio recording is interrupted only for a minimally required time interval, such that the passenger is only disturbed as briefly as possible when listening to entertainment audio recordings.

In order to give the passenger freedom to decide which announcement he/she wishes to hear, or does not wish to hear, the method can comprise the further steps of interrupting, through an action of a user of the on-board entertainment system, the delivery of the announcement via the at least one headset output, and continuing a delivery of entertainment audio recordings through the on-board entertainment system, via the at least one headset output, in response to the interruption of the delivery of the announcement. Through the action, the user (i.e., the passenger) can signal that he/she does not wish to hear an announcement, for example because he/she is already familiar with a safety instruction for putting on life jackets and does not wish to hear it again, or because he/she does not wish to hear flight safety instructions in a further language in addition to the passenger’s native language. Accordingly, the delivery of entertainment audio recordings is continued.

The action of the user of the on-board entertainment system may be insertion of a connector plug into the at least one headset output and/or unplugging of the connector plug from the at least one headset output and/or actuation of an input element (for example, a programme selector pushbutton or a volume controller) of the on-board entertainment system.

According to a further embodiment, the delivery of the announcement via the at least one cabin loudspeaker and the delivery of the announcement via the at least one headset output can be initiated in such a way that the time interval between the first instant and the second instant is less than 30 ms. It was found in trials that time differences are not disturbing for human hearing, or echo effects are not perceived, if the time difference between two like audio signals is less than 30 ms. This embodiment can be used, preferably, if the announcement is stored in the cabin communication facility and/or in the on-board entertainment system. In this case, the delivery of the announcement via the at least one cabin loudspeaker and the delivery of the announcement via the at least one headset output can be initiated with the processing times, or delay times, of the cabin communication facility and of the on-board entertainment system having been taken into account. If, for example, an increased time delay occurs in the on-board entertainment system as a result of a wireless transmission of the announcement to the headset output, the delivery of the announcement via the at least one headset output can be initiated at a correspondingly earlier instant than the delivery via the at least one cabin loudspeaker, such that the delivery via the at least one cabin loudspeaker and the delivery via the at least one headset output begin at substantially the same instant or, in any case, the time difference between the starts of the announcements is less than 30 ms. The duration of the time delay resulting from the wireless transmission can be determined, for example, through trials or calculations and stored in the cabin communication facility and/or in the on-board communication system.

The object set at the outset is further achieved by a system for delivering announcements in a cabin, which system has a cabin communication facility comprising at least one cabin loudspeaker and an on-board entertainment system comprising at least one headset output, the system being able to deliver, beginning at a first instant, an announcement via the at least one cabin loudspeaker, and deliver, beginning at a second instant, the announcement via the at least one headset output, the second instant differing from the first instant, and the system being able to initiate at differing instants the delivery of the announcement via the at least one cabin loudspeaker and the delivery of the announcement via the at least one headset output.

BRIEF DESCRIPTION OF THE DRAWINGS

Preferred embodiments of the present invention are now explained more fully with reference to the appended schematic figures, of which.

DETAILED DESCRIPTION OF THE PREFERRED EMBODIMENTS

Figure 1:
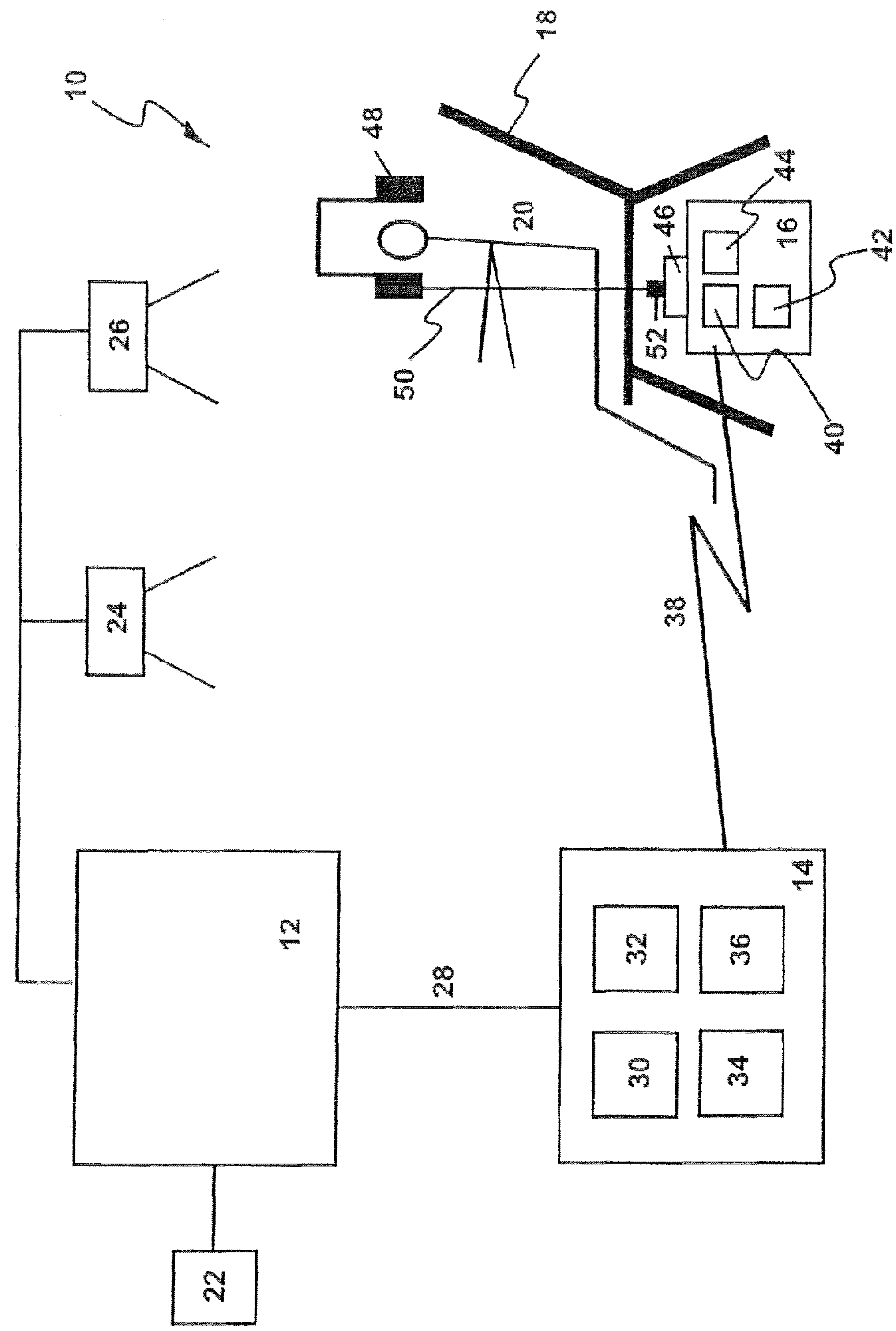
FIG. 1 shows a system for delivering announcements in an aircraft cabin.

A system 10, shown in FIG. 1, for delivering announcements in an aircraft cabin has a cabin communication facility 12, an on-board entertainment system 14, an entertainment-system passenger unit 16 and a passenger seat 18. On the passenger seat 18 there is a passenger 20.

The cabin communication facility 12 is connected to a microphone 22 and two exemplarily represented cabin loudspeakers 24 and 26. The microphone 22 is a microphone that is present in the aircraft cabin, and by means of which, for example, flight attendants can make announcements to the passengers 20 via the cabin loudspeakers 24 and 26. The cabin communication facility 12 is connected to the on-board entertainment system 14 via a connecting line 28.

The on-board entertainment system 14 comprises a control device 30, an A/D converter 32, a storage device 34 and a transmit/receive device 36. The separate entertainment-system passenger unit 16 likewise is part of the on-board entertainment system 14. The control device 30 is a microprocessor, which controls all devices in the on-board entertainment system 14. In particular, the control device 30 controls the transmit/receive device 36, which is set up to communicate with the entertainment-system passenger unit 16 by means of a standardized network protocol. The storage device 34 is a digital memory, which can digitally store audio files converted by the A/D converter 32. Before audio files are stored in the storage device 34, the audio files can be compressed under control of the control device 30, and undergo a noise suppression process.

The on-board entertainment system 14 is connected to the entertainment-system passenger unit 16 via an air interface 38. Only one entertainment-system passenger unit 16 is shown in the embodiment of FIG. 1, but in a practical embodiment a plurality of entertainment-system passenger units 16, in particular one per passenger seat 18, are connected to the on-board entertainment system 14 via a plurality of air interfaces 38. Alternatively, the air interface 38 can also be replaced by a cable connection.

The entertainment-system passenger unit 16 comprises a transmit/receive device 40, a D/A converter 42, a switch 44 and a headset output 46. The transmit/receive device 36 of the on-board entertainment system 14 communicates wirelessly with the transmit/receive device 40 of the entertainment-system passenger unit 16 via the air interface 38. In particular, spoken announcements, entertainment audio and video signals, and control information are transmitted via the air interface 38. The received spoken announcements and entertainment audio signals are converted from digital to analogue by the D/A converter 42 and delivered via the headset output 46.

A headset 48 is connected to the headset output 46. For this purpose, the headset 48 has a connector plug 52, which is attached to one end of a connection cable 50 and which can be inserted into the headset output 46. By means of the headset 48, the passenger 20 can hear, for example, spoken announcements and entertainment audio recordings. Instead of the connection cable 50, a radio connection can also be provided between the headset 48 and the entertainment-system passenger unit 16. The entertainment-system passenger unit 16 can also be integrated in the on-board entertainment system 14, a radio connection also being able to be provided between the headset 48 and the on-board entertainment system 14.

A first embodiment of a delivery of an announcement is explained in the following with reference to FIG. 1 and the time diagram shown in FIG. 2.

In the case of this embodiment, a flight attendant speaks an announcement 1 into the microphone 22. The cabin communication facility 12 picks up the announcement 1 and delivers it directly, i.e. immediately, via the cabin loudspeakers 24 and 26 in the aircraft cabin. By means of a speech recognition mechanism (not shown), the cabin communication facility 12 recognizes that, beginning at an instant ta1, an announcement is spoken into the microphone 22. As a result, the delivery of the announcement 1 via the cabin loudspeakers 24 and 26 is initiated at the instant ta1. Alternatively, the initiation of the delivery of the announcement 1 can also be effected through actuation of a speech pushbutton (not shown) on the microphone 22. It is also conceivable for the initiation of the delivery of the announcement 1 to be effected by an external signal, for example by a signal from the aircraft avionics that signals a loss of pressure in the cabin. In this case, the announcement 1 would be a warning of pressure loss in the cabin.

The announcement 1 picked up via the microphone 22 is further forwarded from the cabin communication facility 12 to the on-board entertainment system 14. In the on-board entertainment system 14, the announcement 1 is converted from analogue to digital by the A/D converter 32, undergoes a noise suppression process under control of the control device 30, and is stored in the storage device 34.

The delivery of the announcement 1 via the cabin loudspeakers 24 and 26 ends at the instant ta2. The ending of the delivery via the cabin loudspeakers 24 and 26 is signalled to the on-board entertainment system 14 by the cabin communication facility 12. In response to this signalling, the control device 30 instructs the transmit/receive device 36, at the instant ta2, to transmit to the transmit/receive device 40 of the entertainment-system passenger unit 16 the announcement 1 that is stored in the storage device 34. Consequently, the delivery of the announcement 1 via the headset output 46 is initiated at the instant ta2. In this embodiment, the time delay between the instants ta1 and ta2 corresponds to the duration of the announcement 1.

In the entertainment-system passenger unit 16, the announcement 1 is converted from digital to analogue in the D/A converter 42 and then delivered to the headset 48 via the headset output 46. The delivery of the announcement 1 via the headset 48 ends at the instant ta3.

During the delivery of the announcement 1 via the cabin loudspeakers 24 and 26, the on-board entertainment system 14 transmits entertainment audio recordings to the entertainment-system passenger unit 16 via the air interface 38, which entertainment-system passenger unit delivers the entertainment audio recordings via the headset output 46. During the delivery of the announcement 1 via the headset output 46, i.e. in the time interval between the instants ta2 and ta3, the delivery of the entertainment audio recordings via the headset output 46 is interrupted. Alternatively, the volume of the delivery via the headset output 46 can be reduced or muted. After the instant ta3, i.e. after the end of the delivery of the announcement 1 via the headset output 46, the delivery of the entertainment audio recording via the headset output 46 is continued.

If, in the time interval between the instants ta2 and ta3, the passenger 20 wishes to interrupt the delivery of the announcement 1 via the headset output 46, he/she can actuate the switch 44, unplug the connector plug 52 from the headset output 46 and/or reinsert the connector plug 52 into the headset output 46. The entertainment-system passenger unit 16 recognizes such an action of the passenger 20 and signals to the on-board entertainment system 14, via the transmit/receive device 40, the air interface 38 and the transmit/receive device 32, that the delivery of the announcement 1 is to be interrupted and the delivery of the entertainment audio recording is to be resumed. Accordingly, via the air interface 38, the on-board entertainment system 14 resumes transmission of entertainment audio recordings, which the entertainment-system passenger unit 16 delivers to the headset 48 via the headset output 46. The entertainment-system passenger unit 16 can have a sensing device (not shown), for example a resistance measuring bridge, for the purpose of sensing the connector plug 52 being plugged into or being unplugged from the headset output 46.

A second embodiment of a delivery of two announcements is explained in the following with reference to FIG. 1 and the time diagram shown in FIG. 3.

Figure 2:
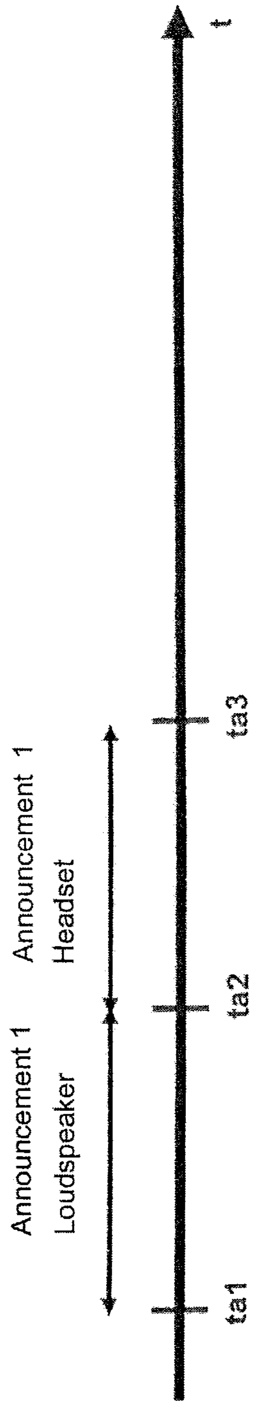
FIG. 2 shows a time diagram of a first embodiment of a delivery of an announcement.
Figure 3:
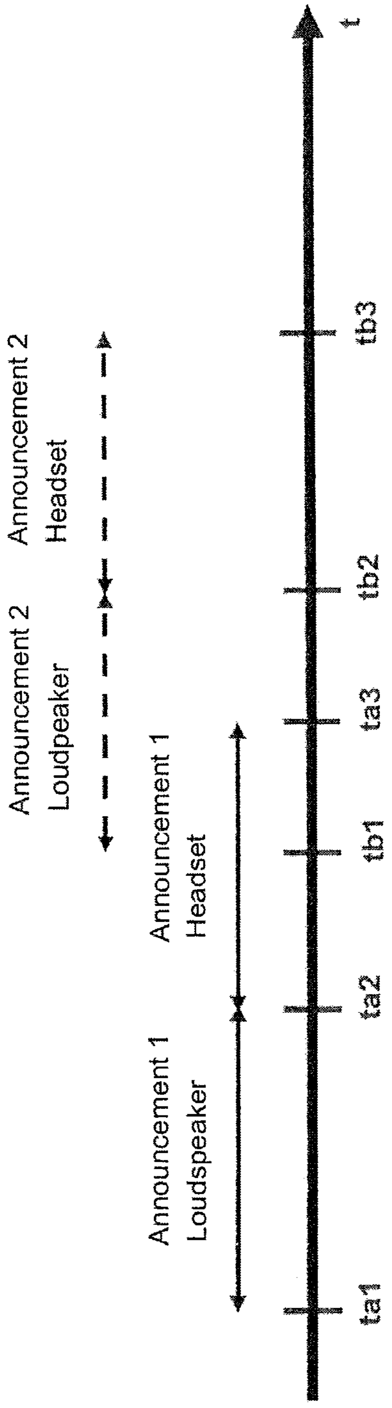
FIG. 3 shows a time diagram of a second embodiment of a delivery of two announcements.

The embodiment of FIG. 3 differs from the embodiment of FIG. 2 in that, during the delivery of the announcement 1 via the headset output 46, i.e. in the time interval between the instants ta2 and ta3, a further announcement 2 is acquired by the cabin communication facility 12 by means of the microphone 22. In this case, actuation of a speech pushbutton on the microphone 22 at an instant tb1 results in initiation of a delivery of the announcement 2 via the cabin loudspeakers 24 and 26, which announcement is delivered directly after the instant tb1, via the cabin loudspeakers 24 and 26. Consequently, in the time interval from the instant directly after the instant tb1 to the instant ta3, there is simultaneous delivery of the remaining part of the announcement 1 via the headset output 46 and a delivery of a first part of the announcement 2 via the cabin loudspeakers 24 and 26, the remaining part of the announcement 2 being delivered subsequently, i.e. up to an instant tb3, via the cabin loudspeakers 24 and 26.

The picked-up announcement 2 is further forwarded from the cabin communication facility 12 to the on-board entertainment system 14. After conversion from analogue to digital by the A/D converter 32, the announcement 2 is stored in the storage device 34. The end of the delivery of the announcement 2 via the cabin loudspeakers 24 and 26 is then signalled to the on-board entertainment system 14, whereupon the on-board entertainment system 14, at an instant tb2, initiates delivery of the stored announcement 2 via the headset output 46.

After the end of the delivery of the announcement 2 via the headset output 46 at the instant tb3, the delivery of the entertainment audio recording via the headset output 46 is continued. In the time interval between the instants ta3 and tb2, the delivery of entertainment audio recordings via the headset output 46 can remain interrupted or be continued. In the case of continuation, the delivery of the entertainment audio recordings via the headset output 46 is interrupted again, at the instant tb2. In the case of further picked-up announcements, execution of the storage and delivery steps described above can be repeated accordingly.

According to an alternative embodiment, it is possible, in the time interval beginning directly after the instant tb1 up to the instant ta3, for only the first part of the announcement 2 to be delivered via the cabin loudspeakers 24 and 26, and for the delivery of the remaining part of the announcement 1 via the headset output 46 to be discontinued or muted. Accordingly, at the instant tb2, a delivery of the announcement 1 via the headset output 46 is first initiated and, after the ending of the delivery of the complete announcement 1 via the headset output 46 (for example, directly thereafter or after expiry of a predefined time interval), a delivery of the announcement 2 via the headset output 46 is initiated.

A third embodiment of a delivery of an announcement is explained in the following with reference to FIG. 1. In this embodiment, an announcement, for example a flight safety instruction, has already been stored in the storage device 34. The announcement was already stored in the storage device 34 before the on-board entertainment system 14 was initially put into operation.

At a first instant, the control device 30 initiates a delivery of the announcement stored in the storage device 34, via the cabin loudspeakers 24 and 26. The initiation of the delivery by the storage device 30 can be activated, for example, by a flight attendant, through actuation of a switch (not shown). As soon as the delivery of the announcement via the cabin loudspeakers 24 and 26 has ended, the control device 30 initiates a delivery of the announcement stored in the storage device 34, via the headset output 46. Consequently, a passenger 20 can hear the stored announcement without an echo effect. Alternatively, the storage of the announcements can also be effected in the cabin communication facility 12. The initiations of the announcements can also be effected by the cabin communication facility 12.

A fourth embodiment of a delivery of announcements is explained in the following with reference to FIG. 1. As in the preceding, third embodiment, in this embodiment an announcement has already been stored in the storage device 34.

According to this embodiment, the control device 30 initiates the delivery of the announcement via the cabin loudspeakers 24 and 26 and the headset output 46 in such a way that the time delay between the delivery of the announcement via the cabin loudspeakers 24 and 26 and the delivery of the announcement via the headset output 46 is less than 30 ms. The first initiation can be activated, for example, by a flight attendant, through actuation of an input means (e.g. a pushbutton). Unlike the preceding embodiments, in this embodiment the time delay between the deliveries is reduced, in that the delivery segment having the greater time delay is activated first, and only then is the other delivery segment activated.

For the purpose of correctly initiating the deliveries, the control device 30 has been informed of the time difference occurring between the delivery of the announcement via the cabin loudspeakers 24, 26 and the delivery of the announcement via the headset output 46 in the case of simultaneous initiation. The measure of this time difference can have been programmed into the control device 30 before the on-board entertainment system 14 is put into operation for the first time. In dependence on this measure, the control device 30 initiates one of the two deliveries earlier. Thus, for example after the actuation of the pushbutton by the flight attendant, the control device 30 can initiate the delivery of the announcement via the headset output 46 earlier, by the known time difference, than the delivery of the announcement via the cabin loudspeakers 24 and 26, such that the announcements are delivered substantially simultaneously, in particular with a time difference of less than 30 ms, via the cabin loudspeakers 24 and 26 and the headset output 46. Accordingly, the passenger 20 does not experience any echo effect.

The invention claimed is:

1. A method for delivering announcements via a cabin communication facility comprising at least one cabin loudspeaker and an on-board entertainment system comprising at least one headset output, the method comprising:

delivering an announcement via the at least one cabin loudspeaker, beginning at a first instant;

delivering the announcement via the at least one headset output, beginning at a second instant, which differs from the first instant;

acquiring the announcement via a microphone connected to the cabin communication facility;

storing the announcement;

directly delivering the acquired announcement via the at least one cabin loudspeaker;

delivering the stored announcement, with a time delay, via the at least one headset output;

acquiring at least one further announcement via the microphone connected to the communication facility while or before the stored announcement is delivered via the at least one headset output;

storing the at least one further announcement; and delivering the stored, at least one further announcement via the at least one headset output after the delivering of the first stored announcement via the at least one headset output wherein the delivering of the announcement via the at least one cabin loudspeaker and the delivering of the announcement via the at least one headset output are initiated at differing instants, wherein the delivering of the announcement via the at least one cabin loudspeaker ends at a third instant, and the second instant is selected so as to correspond with the third instant or chronologically succeeds the third instant, and wherein delivery of the announcement via the at least one headset is effected only after completion of the delivery of the announcement via the at least one cabin loudspeaker such that delivery of the announcement via the at least one headset is not synchronized with delivery of the announcement via the at least one cabin loudspeaker.

2. The method according to claim 1, wherein the delivering of the announcement via the at least one headset output is initiated chronologically after the delivering of the announcement via the at least one cabin loudspeaker.

3. The method according to claim 1, wherein the announcement undergoes analog-to-digital and digital-to-analog conversion before the delivery via the at least one headset output.

4. The method according to claim 3, wherein the announcement is transmitted wirelessly, between the analog-to-digital conversion and the digital-to-analog conversion, via an air interface in the cabin.

5. The method according to claim 1, wherein a noise suppression process is applied to the announcement before the delivery via the at least one headset output.

6. The method according to claim 1, wherein a delivery of entertainment audio recordings through the on-board entertainment system, via the at least one headset output, is interrupted during the delivery of the announcement via the at least one cabin loudspeaker and during the delivery of the announcement via the at least one headset output.

7. The method according to claim 1, wherein a delivery of entertainment audio recordings through the on-board entertainment system, via the at least one headset output, is not interrupted during the delivery of the announcement via the at least one cabin loudspeaker.

8. The method according to claim 1, further comprising:

interrupting, through an action of a user of the on-board entertainment system, the delivery of the announcement via the at least one headset output; and continuing a delivery of entertainment audio recordings through the on-board entertainment system, via the at least one headset output, in response to the interruption of the delivery of the announcement.

9. The method according to claim 8, wherein the action of the user of the onboard entertainment system is at least one of: insertion of a connector plug into the at least one headset output, unplugging of the connector plug from the at least one headset output, and actuation of an input element of the on-board entertainment system.

10. A system for delivering announcements in a cabin comprising:

a cabin communication facility comprising at least one cabin loudspeaker; and an on-board entertainment system comprising at least one headset output, wherein the system is configured to deliver, beginning at a first instant, an announcement via the at least one cabin loudspeaker, and deliver, beginning at a second instant, the announcement via the at least one headset output, the second instant differing from the first instant, the system is configured to initiate at differing instants the delivery of the announcement via the at least one cabin loudspeaker and the delivery of the announcement via the at least one headset output, wherein the delivering of the announcement via the at least one cabin loudspeaker ends at a third instant, and the second instant is selected so as to correspond with the third instant or chronologically succeeds the third instant, wherein delivery of the announcement via the at least one headset is effected only after completion of the delivery of the announcement via the at least one cabin loudspeaker such that delivery of the announcement via the at least one headset is not synchronized with delivery of the announcement via the at least one cabin loudspeaker, and wherein, in the on-board entertainment system, the announcement is converted from analog to digital by an analog-to-digital converter, undergoes a noise suppression process under control of the control device, and is stored in a storage device.

* * * * *